United States Patent
Rusch et al.

(10) Patent No.: US 9,838,128 B1
(45) Date of Patent: Dec. 5, 2017

(54) METHOD AND APPARATUS FOR COUPLING OPTICAL FIBERS

(71) Applicants: Leslie Rusch, Québec (CA); Irfan Muhammad Fazal, Ottawa (CA); Karen Allahverdyan, Québec (CA); Reza Mirzaei Nejad, Québec (CA); Mohammad Mehdi Mansouri Rad, Kanata (CA)

(72) Inventors: Leslie Rusch, Québec (CA); Irfan Muhammad Fazal, Ottawa (CA); Karen Allahverdyan, Québec (CA); Reza Mirzaei Nejad, Québec (CA); Mohammad Mehdi Mansouri Rad, Kanata (CA)

(73) Assignee: Huawei Technologies Canada Co., Ltd., Kanata (CA)

( * ) Notice: Subject to any disclaimer, the term of this patent is extended or adjusted under 35 U.S.C. 154(b) by 0 days.

(21) Appl. No.: 15/258,418

(22) Filed: Sep. 7, 2016

(51) Int. Cl.
  *H04J 14/00* (2006.01)
  *H04B 10/2581* (2013.01)
  (Continued)

(52) U.S. Cl.
  CPC ....... *H04B 10/2581* (2013.01); *G02B 6/2804* (2013.01); *G02B 6/34* (2013.01); *H04B 10/2504* (2013.01); *H04B 10/50* (2013.01)

(58) Field of Classification Search
  CPC ........... H04B 10/2581; H04B 10/2504; H04B 10/50; G02B 6/2804; G02B 6/34;
  (Continued)

(56) References Cited

U.S. PATENT DOCUMENTS

| | | | |
|---|---|---|---|
| 9,413,448 B2* | 8/2016 | Ashrafi | H04B 7/0697 |
| 9,712,239 B2* | 7/2017 | Murshid | H04B 10/2581 |

(Continued)

OTHER PUBLICATIONS

Lyubopytov et al., "Optical-Domain Mode Coupling Compensation for Mode Division Multiplexing Systems", Proceeding of SPIE, vol. 9156, Apr. 4, 2014.
Amphawan et al., "Mode Division Multiplexing of Spiral-phased Donut Modes in Multimode Fiber", Proceeding of SPIE, vol. 9524, Jul. 17, 2015.
Shwartz et al., "Excitation of Mode Groups in Multimode Fibers With the aid of Diffractive Optics", IEEE Photonics Technology Letters, vol. 28 (16), Aug. 15, 2016.
(Continued)

*Primary Examiner* — M. R. Sedighian

(57) ABSTRACT

A system and method are presented for coupling OAM optical beams to optical fibers. The system may include, for instance, an OAM beam generator, for receiving one or more of a plurality of input signals, and generating a different OAM mode signal for each input signal. The OAM beam generator may further be operative to adjust a location and/or an exit angle of the one or more OAM mode signals before sending the one or more OAM mode signals to a beam combiner that combines the one or more OAM mode signals into a combined mode OAM transmission. The system may further include a controller in communication with at least one crosstalk estimate sensor and the at least one OAM beam generator, the controller operative to optimize the crosstalk estimate by receiving the crosstalk estimate for one of the OAM mode signals, and sending control instructions instructing the OAM beam generator to adjust a location and/or an exit angle of the one or more OAM mode signals to reduce the crosstalk estimate.

21 Claims, 7 Drawing Sheets

(51) Int. Cl.
*H04B 10/25* (2013.01)
*H04B 10/50* (2013.01)
*G02B 6/28* (2006.01)
*G02B 6/34* (2006.01)

(58) Field of Classification Search
CPC ........ H04J 14/00; H04J 14/002; H04J 14/022; H04J 14/0227; H04J 14/026; H04J 14/0265
USPC ......... 398/43, 44, 79, 82, 93, 140, 141, 183, 398/198
See application file for complete search history.

(56) References Cited

U.S. PATENT DOCUMENTS

| | | | |
|---|---|---|---|
| 9,768,909 B2* | 9/2017 | Huang | H04J 14/04 |
| 2016/0028479 A1* | 1/2016 | Ren | H04B 10/1123 398/43 |
| 2016/0212510 A1* | 7/2016 | Bogoni | H04J 14/04 |

OTHER PUBLICATIONS

Appaiah et al., "Offset Coupling, Feedback, and Spatial Multiplexing in 4×4 Incoherent-MIMO Multimode Fiber Links", Journal of Lightwave Technology, vol. 31 (17), Sep. 1, 2013.

International Search Report dated Jun. 1, 2017 for corresponding International Application No. PCT/IB2016/056136 filed Oct. 13, 2016.

C. R. Doerr, N. Fontaine, M. Hirano, T. Sasaki, L. Buhl, and P. Winzer, "Silicon photonic integrated circuit for coupling to a ring-core multimode fiber for space-division multiplexing," in 37th European Conference and Exposition on Optical Communications, Geneva, p. Th.13.A.3, Sep. 18, 2011.

N. K. Fontaine, C. R. Doerr, and L. Buhl, "Efficient Multiplexing and Demultiplexing of Free-space Orbital Angular Momentum using Photonic Integrated Circuits," in Optical Fiber Communication Conference, p. OTu1I.2., Jan. 23, 2012.

C. R. Doerr and L. L Buhl, "Circular grating coupler for creating focused azimuthally and radially polarized beams," Optics letters, vol. 36, pp. 1209-1211, Apr. 1, 2011.

* cited by examiner

METHOD AND APPARATUS FOR COUPLING OPTICAL FIBERS

FIELD OF THE INVENTION

The present invention pertains to the field of optical communications, and in particular to a method and apparatus for coupling light into optical fibers.

BACKGROUND

Optical communication networks employ the transmission of light through optical fibers. In order to carry larger amounts of data, next generation optical communication methods have been proposed that use orbital angular momentum (OAM) optical modes propagating in OAM optical fibers for optical communications.

One issue that arises generally in optical communications is the alignment of the optical fiber at connection points. In OAM applications, the signal may be created in free space and directed at a fiber end. As a result, optical alignment requires high precision, since misalignment can result in significant optical losses.

The current techniques proposed to align fibers for OAM optical communication rely on mechanical apparatus to align fiber end(s). Presently, the alignment is static. Precision of static alignment may deteriorate with temperature and physical shock or impact of apparatus.

Accordingly, there is a need for a system and method to provide fiber alignment, and in particular for OAM optical fiber applications.

This background information is provided to reveal information believed by the applicant to be of possible relevance to the present invention. No admission is intended, nor should be construed, that any of the preceding information constitutes prior art and is provided only as general context for the present invention. As OAM optical communication is a new area of study, there is a limited amount of common general knowledge beyond conventional optical communication knowledge.

SUMMARY

In an implementation a method is provided for coupling optical signals into OAM modes for joint transmission in an optical fiber. The method may include: receiving a plurality of input signals for transmission as a corresponding number of different OAM mode signals; generating a different OAM mode signal from each of the input signals; combining the OAM mode signals to obtain a combined mode signal; injecting the combined OAM mode signal into the optical fiber for transmission to a receiving location; receiving control instructions from a controller in communication with the receiving location; and, adjusting at least one of a relative position and angle of at least one of the OAM mode signals when combining.

In an aspect, the plurality of input signals may further comprise a signal for transmission as a fundamental mode signal of the optical fiber. In the aspect, the combining the OAM mode signals further comprises combining the fundamental mode signal with the OAM mode signals to produce the combined OAM mode signal. In an aspect, the control instructions are based on a crosstalk estimate for at least one of the modes. In an aspect, the generating is performed using at least one programmable spatial light modulator (SLM), and wherein the adjusting further comprises laterally translating a spatial phase pattern used by the at least one programmable SLM to generate the OAM mode signals. In an aspect, the adjusting is performed by changing an angle of a tip-tilt optical element.

In an implementation a method is provided for controlling an OAM transmitter generating OAM mode transmissions coupled to an optical fiber. The method may include a receiver: receiving from the optical fiber an OAM mode transmission; converting at least one OAM mode signal from the OAM mode transmission into a corresponding received signal; tapping off a portion of the corresponding received signal and obtaining a crosstalk estimate from the portion; and, providing the crosstalk estimate to a controller in communication with the OAM transmitter, wherein the controller is operative to use the crosstalk estimate to transmit control instructions to the OAM transmitter to change at least one of a position and an exit angle of the OAM mode signal before combination to produce the OAM mode transmission.

In an implementation a method is provided for controlling an OAM transmitter generating an OAM mode transmission coupled to an optical fiber. The method may include a controller: receiving from an OAM receiver a crosstalk estimate for an OAM mode signal associated with the OAM mode transmission; transmitting control instructions based on the received crosstalk estimate to the OAM transmitter, the control instructions instructing the OAM transmitter to change at least one of a position and an exit angle of the OAM mode signal to be combined into the OAM transmission.

In an aspect, the crosstalk estimate comprises a power level measurement of the OAM mode signal taken by the receiver. In an aspect, the controller may be further operative to optimize the crosstalk estimate by iteratively receiving the crosstalk estimate, and transmitting control instructions, until the crosstalk estimate is reduced. The OAM mode transmissions may comprise a plurality of different OAM mode signal. Accordingly, the controller may be further operative to optimize the crosstalk estimate by further iterating through each of the different OAM mode signals to collectively reduce the crosstalk estimates for all of the OAM mode signals.

In an implementation an OAM optical beam transmitter may be provided, including: at least one OAM beam generator, for receiving a plurality of input signals, and generating an OAM mode signal from each input signal; and, a beam combiner operative to receive the OAM signal and to combine the received OAM mode signals to produce a combined mode signal; wherein the at least one OAM beam generator is further operative to adjust a position and/or an exit angle of each OAM mode signal before sending each OAM mode signal to the beam combiner. In an aspect, the at least one OAM beam generator comprises a programmable SLM, and is operative to adjust a position and/or an exit angle of the OAM mode signal by translating a spatial phase pattern used by the programmable SLM to generate the OAM mode signal. In an aspect, the at least one OAM beam generator is operative to adjust the position and/or an exit angle of each OAM mode signal by changing an angle of a corresponding tip-tilt optical element. In an aspect, wherein the at least one OAM beam generator is further operative to receive and act on control instructions from a controller, the control instructions indicating the adjustment of the position and/or exit angle of each OAM mode signal. In an aspect, the at least one OAM beam generator is selected from the group consisting of: a programmable spatial light modulator (SLM); a circular grating coupler; a diffraction grating; and, integrated versions of one or more of a SLM, a circular grating coupler, and a diffraction grating.

In an implementation a system is provided for coupling optical signals into OAM modes for joint transmission in an optical fiber. The system may include: at least one OAM beam generator, for receiving one or more of a plurality of input signals, and generating a different OAM mode signal for each of the plurality of input signals; a beam combiner operative to receive the OAM signals and to combine the received OAM mode signals to produce a combined mode signal; wherein the at least one OAM beam generator is further operative to adjust a location and/or an exit angle the OAM mode signals before sending the OAM mode signals to the beam combiner; a fiber launcher for injecting the combined mode signal into an optical fiber; a receiver for receiving the combined mode signal from the optical fiber and converting from the combined modes each OAM mode signal into a corresponding received fundamental mode; at least one crosstalk estimate sensor for obtaining a crosstalk estimate for each OAM mode signal; and, a controller in communication with the at least one crosstalk estimate sensor and the at least one OAM beam generator, the controller operative to optimize the crosstalk estimate by receiving the crosstalk estimate one of the OAM mode signals, and sending control instructions instructing the at least one OAM beam generator to adjust a location and/or an exit angle of the one or more OAM mode signals to reduce the crosstalk estimate.

In an aspect, the controller is further operative to iteratively receive crosstalk estimates and send control instructions to the at least one OAM beam generator until the crosstalk estimate is reduced. In an aspect, the controller is further operative to reduce a collective crosstalk estimate for all of the OAM mode signals by iterating through each of the OAM mode signals. In an aspect, the crosstalk estimate sensor comprises a power meter for measuring a power level of each of the one or more OAM mode signals. In an aspect, the at least one optical beam generator comprises a programmable SLM, and wherein the at least one OAM beam generator is further operative to adjust a position and/or an exit angle of the one or more OAM mode signals by translating a spatial phase pattern used by the programmable SLM to generate the one or more OAM mode signals. In an aspect, the at least one OAM beam generator is selected from the group consisting of: a programmable spatial light modulator (SLM); a circular grating coupler; a diffraction grating; and, integrated versions of one or more of a SLM, a circular grating coupler, and a diffraction grating.

Other aspects provide for processing systems which include a processor and machine readable memory storing software instructions which when executed cause said processor to carry out the methods disclosed herein, including instantiating and migrating the virtual entities which implement said methods.

BRIEF DESCRIPTION OF THE FIGURES

Further features and advantages of the present invention will become apparent from the following detailed description, taken in combination with the appended drawings, in which.

DETAILED DESCRIPTION

Figure 1A:
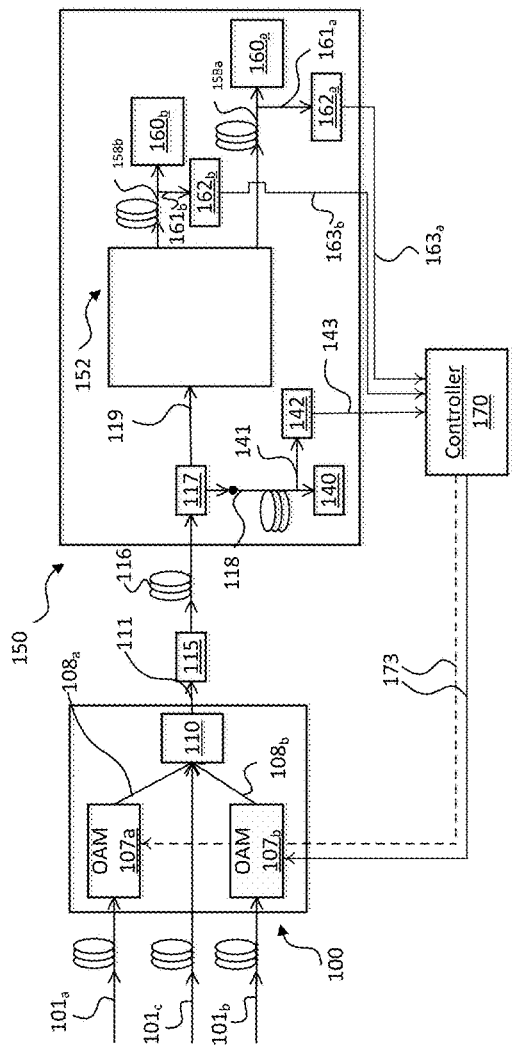
FIG. 1A illustrates an embodiment of an optical communications system.

Referring to FIG. 1A, a system is presented for aligning and coupling optical fibers. In OAM optical communications, the OAM signal may be generated in free space, and directed at the fiber end. Alignment of that direction with the fiber end directly relates to undesired crosstalk between OAM modes, as well as the efficiency of the resultant transmission through the fiber. In the example of FIG. 1, an OAM transmitter 100 is presented as combining three signals for injection into an fiber optic cable 116. The three signals being combined are a fundamental mode and two orthogonal OAM modes. While three signals are being illustrated for clarity, in practice a plurality of signals may be combined, using a corresponding plurality of OAM modes and, optionally, the fundamental mode.

In the exemplar embodiment of FIG. 1A, three single mode optical fibers each carry one of three input signals, or channels, $101_a$, $101_b$, $101_c$ that are input to the OAM transmitter 100, which generates a combined output signal 111 for injection by a fiber launcher 115 into the optical fiber 116 for transmission to an OAM receiver 150 located at a receiving end. As a practical example, the OAM transmitter 100 may be located at a control centre, and the receiver 150 may be located at a remote location such as a base station to broadcast a wireless communication signal. The OAM transmitter 100 receives and converts the two input signals $101_a$, $101_b$ into OAM mode signals $108_a$, $108_b$, and combines the two OAM mode signals $108_a$, $108_b$ with the fundamental mode, input signal $101_c$ in a beam combiner 110. The combined OAM multi-mode signal 111 is input to the fiber launcher 115 for injection into the fiber optic cable. The fundamental mode input signal $101_c$ is optional, and may be use for OAM optical fibers maintaining a fundamental mode of propagation.

In the embodiment of FIG. 1A, the transmitter 100 includes a free space OAM mode multiplexer that converts the two input signals $101_a$, $101_b$ into separate transformed OAM mode signals $108_a$, $108_b$ using one or more programmable OAM beam generators $107_a$, $107_b$. The programmable OAM beam generators $107_a$, $107_b$ are each operative to transform the free space mode field of a corresponding one of the two input signals $101_a$, $101_b$ into the desired OAM mode for the OAM beam generators $107_a$, $107_b$. In an aspect, each OAM beam generator $107_a$, $107_b$ is operative to transform a single input signal $101_a$, $101_b$. In an aspect, each OAM beam generator $107_a$, $107_b$ is operative to transform a plurality of input signals $101_a$, $101_b$. In the example of FIG. 1, each OAM beam generator $107_a$, $107_b$ is operative to transform a single input signal $101_a$, $101_b$, and accordingly there are a pair of OAM beam generators $107_a$, $107_b$ to match the pair of input signals $101_a$, $101_b$ to be transformed e.g. from the fundamental mode to separate OAM modes. For instance, the OAM beam generator $107_a$, $107_b$ may incorporate a programmable spatial light modulator (SLM) a circular grating coupler, or a diffraction grating (or integrated versions of these discrete components) may be used to transform the input signals from the fundamental mode to the one or more OAM modes. As indicated above, the use of two OAM modes is for illustrative purposes, and embodiments may include one or more OAM modes, depending upon the implementation.

The transformed signals $108_a$, $108_b$, along with the fundamental mode signal $101_c$, are directed through free space to the beam combiner 110. The location of the incident signals $108_a$, $108_b$, $101_c$ as they transition from free space to the beam combiner 110 affects their alignment upon injection into the optical fiber 116. Poor alignment of incident signals $108_a$, $108_b$, $101_c$ may lead to interference between the signals (cross-talk), as well as loss of energy in some or all of the received modes at the receiving end. Control over the adjustments may be achieved through embodiments described below.

According to an embodiment, the alignment of the transformed signals $108_a$, $108_b$ may be controlled by the OAM beam generators $107_a$, $107_b$ which may, in addition to the mechanism for transforming each input signal $101_a$, $101_b$ from the fundamental mode to one of the available OAM modes, include a mechanism for adjusting the position and/or exit angle of each transformed signal $108_a$, $108_b$, and/or $108_c$ from the corresponding OAM beam generator $107_a$, $107_b$. In an alternate embodiment, an alignment adjustment component may be provided for adjusting the position and/or exit angle of each transformed signal $108_a$, $108_b$ $108_a$, $108_b$, and/or $108_c$. Such an alignment adjustment component may be disposed separately from the corresponding OAM beam generators $107_a$, $107_b$. For simplicity, both embodiments are included when referring to the term OAM beam generator $107_a$, $107_b$.

In an implementation the OAM beam generators $107_a$, $107_b$ may comprise one or more programmable SLM, and they may be operative to adjust the location and exit angle of each transformed signal by translating, scaling, or otherwise modifying a spatial phase pattern presented to the input signals $101_a$, $101_b$. In an implementation the OAM beam generators $107_a$, $107_b$ may comprise one or more mechanical beam displacement devices, such as a tip-tilt optical element (e.g. a mirror, plate, wedge, etc.), to adjust the location and exit angle of each transformed signal. In an implementation, the OAM beam generators $107_a$, $107_b$ may comprise a thermal or piezo adjustment stage for adjusting the location and exit angle of each transformed signal.

Adjusting the location and exit angles of the transformed signals $108_a$, $108_b$ from the corresponding OAM beam generator $107_a$, $107_b$ changes the location and angle of incidence of the transformed signals $108_a$, $108_b$ on the beam combiner 110, and accordingly changes their position relative to the optical fiber 116 upon injection by the fiber launcher 115.

In order to control the positioning of the incident signals $108_a$, $108_b$, $101_c$, the controller 170 may take control actions to adjust the location and exit angle of each transformed signal based upon minimizing a measured crosstalk between the multiple modes after injection into the optical fiber. The controller 170 may take the control actions by sending control instructions to the OAM generators $108_a$, $108_b$ through the control links 173. The control instructions indicating an adjustment to be taken by the OAM generators $108_a$, $108_b$ to adjust the location and exit angle of at lest one transformed signal. The effect of the control instructions being a change in the relative position of at least one of the incident signals $108_a$, $108_b$, $101_c$ as it is received by the beam combiner 110.

In an aspect, the crosstalk measurement may be made at a receiving location that receives the transformed signals from the optical fiber 116. As known, crosstalk may be estimated based upon a number of measurements including, for instance, the resultant mode quality and downstream power levels. The present application describes a second aspect of the invention which utilises downstream power levels to measure crosstalk as the currently perceived best mode, but other known methods of measuring crosstalk are contemplated as falling within the scope of the invention. An advantage of the embodiment described in this application is that estimating crosstalk based upon a measurement of power levels may be made accurately by a relatively inexpensive and simple optical power measuring device. The crosstalk estimate is used by the controller 170 as feedback to guide the adjustment of the incident signals $108_a$, $108_b$, $101_c$.

In an implementation, the controller 170 employs a cost function based upon the crosstalk estimate to guide the location of the incident signals $108_a$, $108_b$, $101_c$. In general, the cost function is based upon the crosstalk estimate taken for the input signal being adjusted. For instance, if the OAM beam generator $107_a$ is generating OAM "minus one" mode, the success of the location of the resultant transformed beam is evaluated based upon the resultant crosstalk estimate of OAM "plus one" mode on the receiving side of the optical fiber 116. In an implementation, the cost function may allow for joint optimization across multiple modes. In an aspect, the cost function may allow for individual optimization on a per mode basis. In part, choice of an appropriate optimization strategy is dependent upon the number of modes being transformed, and the level of precision (i.e. resultant transmission efficiency) required.

Referring to FIG. 1A, an embodiment of a power level measurement system and method is presented. The receiver 150 includes both a power level measurement system and method, as well as an apparatus to receive and convert the OAM modes to conventional fundamental mode optical signals.

A signal propagated in the optical fiber 116 is received by the receiver 150 and the received signal is split into two paths by a beam splitter 117. The fundamental mode path 118 extracts the fundamental mode from the received signal. In an aspect, this can be accomplished by transitioning from free space to a single mode fiber (SMF) which only captures the fundamental mode. The fundamental mode may, alternatively, be captured using other known techniques. After the fundamental mode has been extracted, the signal may be received by the fundamental mode receiver 140. A power level of the fundamental mode may be estimated by tapping off a fraction of the fundamental mode through tap line 141 for input to a crosstalk estimate sensor such as the power meter 142. The power meter 142 provides a fundamental mode power level measurement to the controller 170.

Figure 1B:
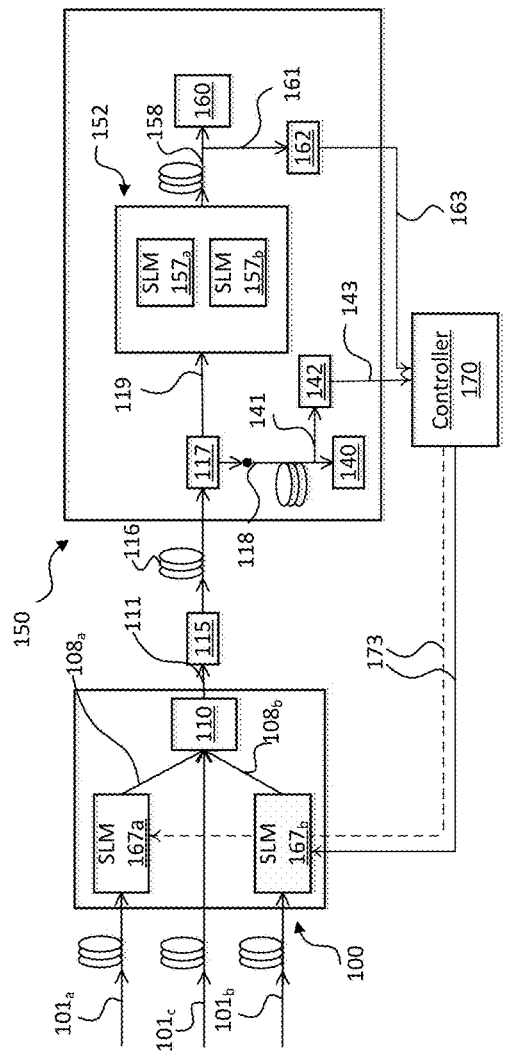
FIG. 1B illustrates an embodiment of an optical communications system.

An OAM mode path 119 is input into an OAM de-multiplexer 152 that includes an OAM converter for extracting a mode corresponding to each of the OAM modes. OAM converter may include, for instance a SLM presenting a spatial phase pattern for extracting the corresponding OAM mode(s). Alternatively, the OAM converter may comprise other known apparatus for converting OAM modes, such as a circular grating coupler or diffraction grating (or integrated versions of these discrete components). In either case, the OAM converter may convert the OAM modes to fundamental modes, either as separate beams $158_a$, $158_b$, or selectively as a single polarized beam 158 (as illustrated in FIG. 1B) for each of the OAM modes, where the modes may be diversified by polarization (e.g. H polarization and V polarization). Referring to FIG. 1A, where separate fundamental mode beams $158_a$, $158_b$ are extracted, they may be input to corresponding OAM mode receivers $160_a$, $160_b$.

A power level of each of the OAM modes may be estimated by tapping off a fraction of the fundamental mode beams $158_a$, $158_b$ through tap lines $161_a$, $161_b$ for input to a crosstalk estimate sensor such as the power meters $162_a$, $162_b$. The power meters $162_a$, $162_b$ each provide an OAM mode power level measurement for the corresponding OAM beam to the controller 170 through measurement lines $163_a$, $163_b$.

The power level measurements may be used, as described above, as input to assist in optimizing the incident beam alignment at the OAM transmitter 100. In operation, a method may be provided for aligning the generated OAM modes with an optical fiber 116 for transmission.

In an implementation, the controller 170 may start with a calculated power level for each of the modes to be transmitted. The calculated power level based upon a modelled transmission for a particular optical link. In an alternate implementation, the controller 170 may seek to optimize the measured power levels without reference to a calculated power level.

In either case, the input signals are input to the OAM transmitter 100 for conversion to OAM mode signals $108_a$, $108_b$, and to combine the OAM mode signals $108_a$, $108_b$ with the fundamental mode in the beam combiner 110. The combined OAM multi-mode signal 111 is input to the fiber launcher 115 for injection into the optical fiber 116. At the receiving end the optical fiber 116 is received by the receiver 150 and split into the two paths, the fundamental mode path 118 and the OAM mode path 119, by the beam splitter 117. The power levels of the fundamental mode and OAM modes may be measured by the power meters 142, $162_a$, $162_b$. Depending upon the implementation, the power levels may be measured continuously, or may be iteratively measured. In either case, the controller 170 may receive the initial measurements of the power levels to establish a power level base line for the optimization.

Once the power level base line has been established, the controller may send control instructions to one of the OAM beam generators $107_a$, $107_b$ to adjust the position and/or exit angle for that transformed signal $108_a$, $108_b$. Once the position has been adjusted a new round of power levels may be measured with the transformed signals $108_a$, $108_b$ in the new location. The power levels for each of the transformed signals $108_a$, $108_b$ may be optimized by conducting an optimization operation based upon the search space of the range of position controls for each of the OAM beam generators $107_a$, $107_b$.

Referring to FIG. 1B, in an embodiment the OAM beam generators $107_a$, $107_b$ may comprise spatial light modulators (SLM) $167_a$, $167_b$. The SLM $167_a$, $167_b$ each receive an incident beam on a programmable spatial phase pattern created by that SLM $167_a$, $167_b$. The spatial phase pattern is formed so as to generate the desired OAM mode for that incident beam. In an aspect, the SLM $167_a$, $167_b$ may each transform a plurality of incident beams into a corresponding plurality of OAM mode signals, each in a different OAM mode. In the aspect, the programmable spatial phase pattern is selected to generate the different OAM modes for each of the incident beams.

In an embodiment, the SLM $167_a$, $167_b$ may perform the dual function of providing alignment functionality in addition to converting the two input signals $101_a$, $101_b$ into transformed signals $108_a$, $108_b$ (e.g. OAM mode signals). The alignment function may be provided by exploiting the programmability of the SLM to translate the spatial phase pattern presented by the SLM $167_a$, $167_b$ relative to the incident beam(s), which is conventionally approximately centered on the spatial phase pattern for mode generation. The translation of the spatial phase pattern causes the resultant transformed beam to shift in offset and angle of incidence from the free space input signal $101_a$, $101_b$ beam incident on the spatial phase pattern. The spatial phase pattern may be translated electronically (i.e. by a controller 170 sending control instructions to the SLM $167_a$, $167_b$ through control links 173) imparting a shift or translation of the spatial phase pattern position presented by the SLM $167_a$, $167_b$. In an embodiment a single SLM $167_a$, $167_b$ may be used to generate, and adjust the alignment of, a plurality of OAM modes. In the embodiment, the spatial phase pattern is adjusted to affect the exit path of each of the plurality of OAM modes.

As a result of the translation of the spatial phase pattern, the resultant transformed signals $108_a$, $108_b$ exit paths will shift, allowing for movement of the incident point of the transformed signals $108_a$, $108_b$ with the beam combiner 110 to better align with the target fiber. Despite the translation of the spatial phase pattern, which affects the exit path of the transformed signals $108_a$, $108_b$ from the SLM $167_a$, $167_b$, the transformed signals will still result in the same intended mode being generated for the transformed signals $108_a$, $108_b$. An advantage of using spatial phase pattern positioning to affect exit beam alignment is that the resolution of the positioning may be finer than for a mechanical alignment stage typically used to couple a free space beam into a fiber. The resolution being generally limited by the resolution of the pixel pattern generated by the SLM $167_a$, $167_b$. Furthermore, future adjustments may be performed remotely through instructions sent to the controller 170, rather than requiring physical re-positioning of apparatus. In an aspect, the spatial phase pattern positioning may be combined with a mechanical apparatus to allow for initial coarse positioning using a mechanical and/or a liquid crystal based apparatus, and then fine positioning, and/or updated future positioning being effected by spatial phase pattern positioning. The power levels for each of the transformed signals $108_a$, $108_b$ may be optimized by conducting an optimization operation based upon the search space of the four axes (SLM $167_a$-x-y; SLM $167_b$-x-y).

Referring again to FIG. 1B, in an embodiment the OAM de-multiplexer 152 may include a logical SLM $157_a$, $157_b$, or a physically separate SLM $157_a$, $157_b$, for each OAM mode being extracted. The SLM $157_a$, $157_b$ may be controlled by the controller 170, or may have a separate controller (not shown in FIG. 1). Each of the SLM $157_a$, $157_b$ operative to receive an incident beam and to extract one or more OAM modes from that incident beam using a programmable spatial phase pattern created by that SLM $167_a$, $167_b$. The spatial phase pattern may be selected so as to extract the desired OAM modes from the incident beam.

The SLM $157_a$, $157_b$ convert the received OAM modes to non-OAM modes e.g. fundamental modes, either as separate fundamental mode beams, or selectively as a single polarized fundamental mode beam 158 for each set of two OAM modes. In the case of a single polarized fundamental mode beam 158, where the modes may be diversified by orthogonal polarization (e.g. H polarization and V polarization). As illustrated in FIG. 1B, the polarized fundamental mode beam 158 may be input to a single OAM mode receiver 160 to extract the two signals from the single beam. The OAM mode receiver 160 operative to select between the two polarizations to extract the two signals.

A power level of each of the OAM modes may be estimated by selectively tapping off a fraction of the polarized beam 158 through tap line 161 for input to a crosstalk estimate sensor such as the power meter 162. The power meter 162 providing an OAM mode power level measurement for a selected polarization form the polarized beam 158 to the controller 170 through respective measurement line 163.

Figure 2:
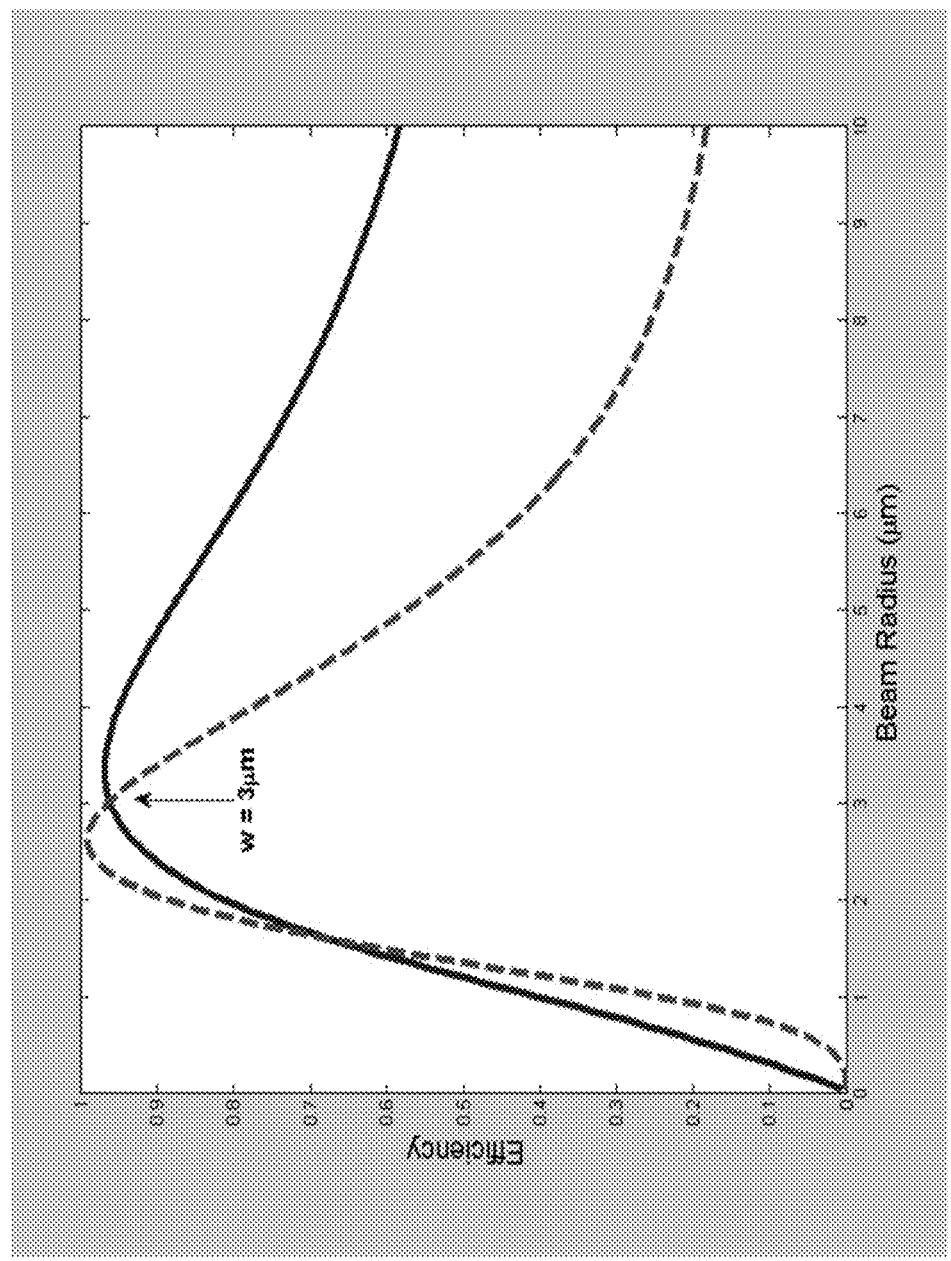
FIG. 2 illustrates an exemplary plot of beam radius vs. efficiency for two different modes.

Referring to FIG. 2, an illustration of the beam radius vs. efficiency, i.e. the power level, for two different modes (e.g. fundamental and OAM modes) is illustrated. The optimization problem is to find the compromise point where both modes have an optimised coupling for a given beam characteristic. By tapping off of each of the modes at the receiver 150, a power level estimate may be made for each mode, allowing for optimization of the beam alignment. Accordingly, the crosstalk estimates may be optimized by collectively minimizing the crosstalk estimates for all of the OAM mode signals. In some implementations one or more of the OAM mode signals will not have an individual minimized crosstalk estimate, but the collective group of OAM mode signals will have a collectively reduced crosstalk estimate.

In practice, the optimization problem may consider more than the beam radius. For instance, in the case of the OAM generators being programmable SLMs $157_a$, $157_b$, the optimization may consider a fixed beam size and change translation of the spatial phase pattern presented by the SLM $157_a$, $157_b$, or a fixed beam size position and change the composition of the spatial phase pattern.

Figure 3:
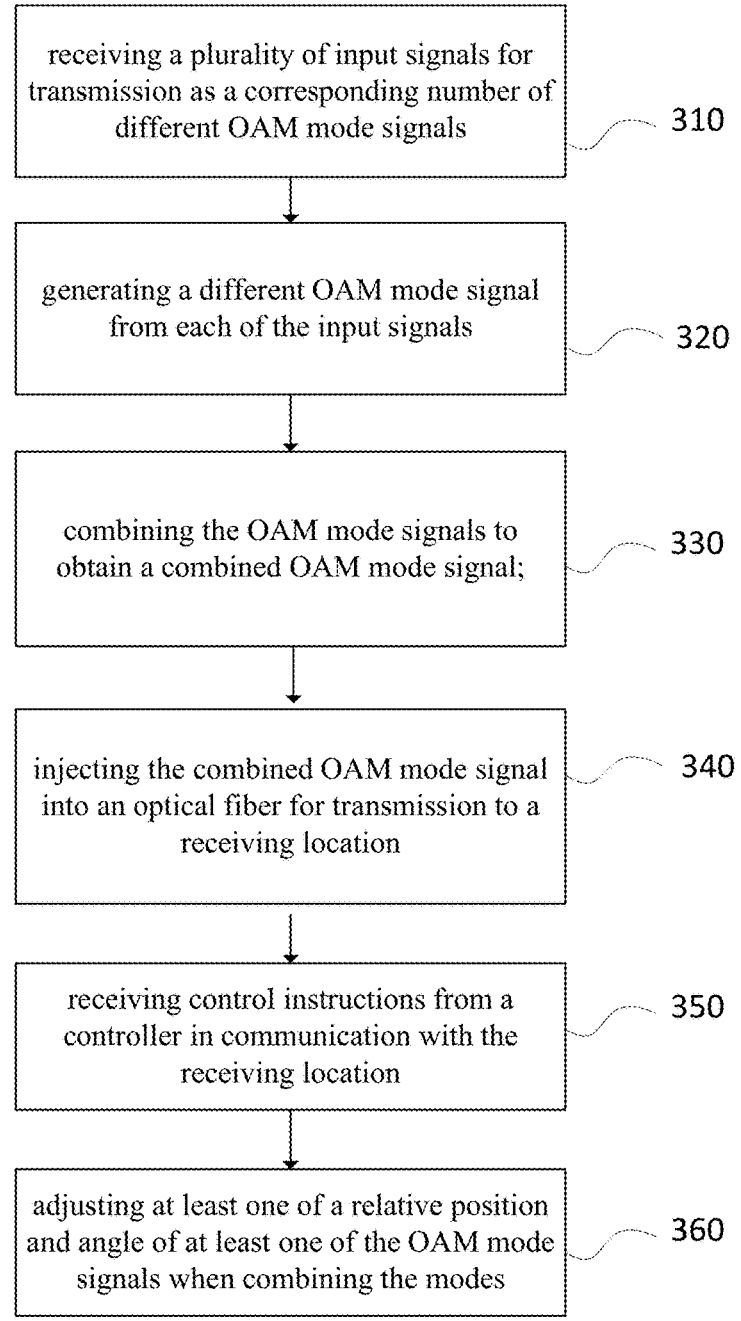
FIG. 3 illustrates an embodiment of a method for execution by an OAM transmitter to couple optical signals into OAM modes for joint transmission in an optical fiber.

Referring to FIG. 3, in an implementation a method is provided for execution by an OAM transmitter to couple optical signals into OAM modes for joint transmission in an optical fiber. In step 310, the OAM transmitter receives a plurality of input signals for it to transmit as a corresponding number of different OAM mode signals. In step 320, a different OAM mode signal is generated from each of the input signals. In some aspects, one of the input put signals may be transmitted as the fundamental mode, and not converted into an OAM mode signal. In step 330 the OAM mode signals are combined to obtain a combined OAM mode signal. Where a fundamental mode signal is to be included, it is further combined with the OAM mode signals to make up the combined OAM mode signal. In step 340 the combined OAM mode signal is injected into an optical fiber for transmission to a receiving location. In step 350, the OAM transmitter receives control instructions from a controller in communication with the receiving location. In step 360 the OAM transmitter uses the control instructions to adjust at least one of a relative position and angle of at least one of the OAM mode signals when combining the modes.

Figure 4:
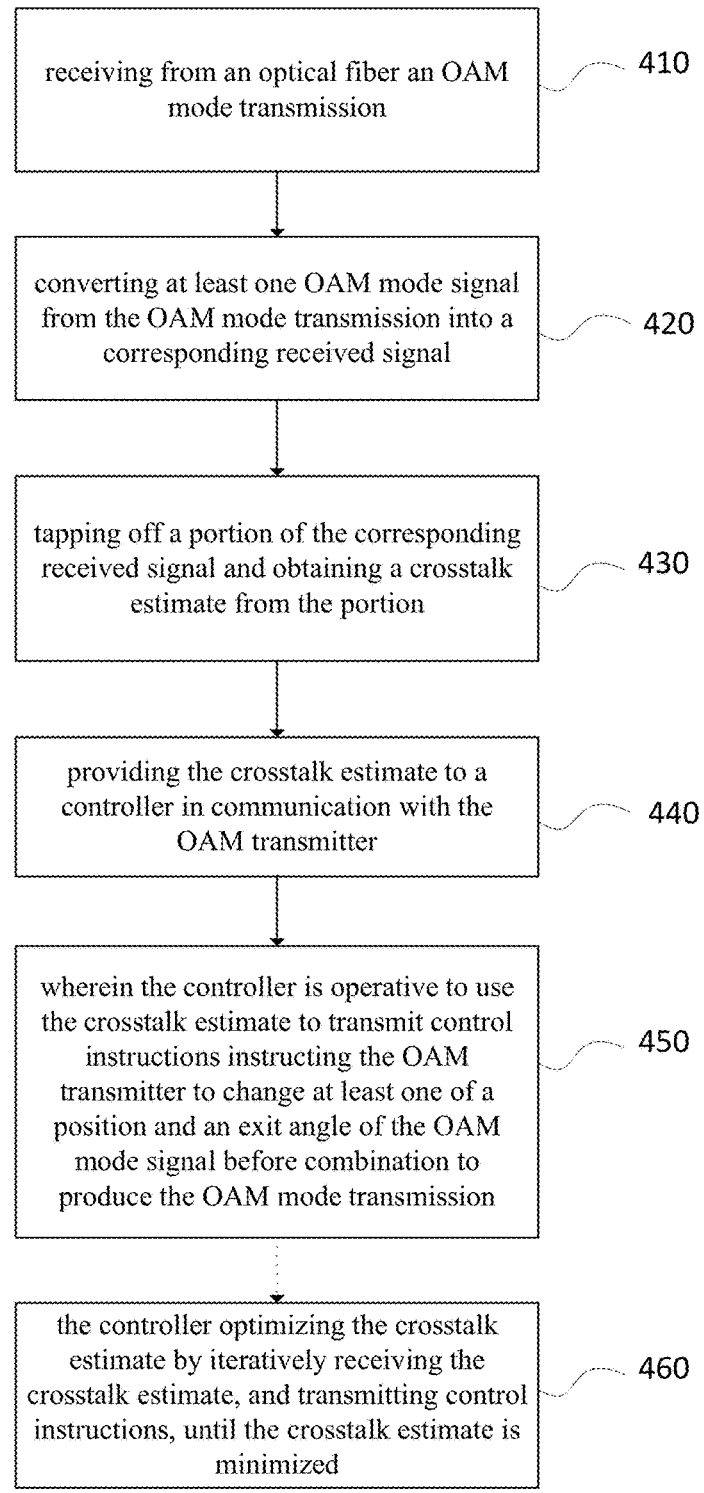
FIG. 4 illustrates an embodiment of a method for controlling an OAM transmitter.

Referring to FIG. 4, in an implementation a method is provided for controlling an OAM transmitter. In step 410 the receiver receives an OAM mode transmission from an optical fiber. In step 420 at least one OAM mode signal from the OAM mode transmission is converted into a corresponding received signal. In step 430 at least a portion of the corresponding received signal is tapped off and a crosstalk estimate is obtained from the portion. In step 440 the crosstalk estimate is provided to a controller in communication with the OAM transmitter. In step 450, the controller may use the crosstalk estimate generate and transmit control instructions instructing the OAM transmitter to change at least one of a position and an exit angle of the OAM mode signal before combination to produce the OAM mode transmission. The purpose of the change is to reduce the crosstalk estimate obtained by the receiver. In optional step 460, the control may the controller optimize the crosstalk estimate by iteratively receiving the crosstalk estimate, and transmitting control instructions to the OAM transmitter, until the crosstalk estimate is reduced or minimized.

Figure 5:
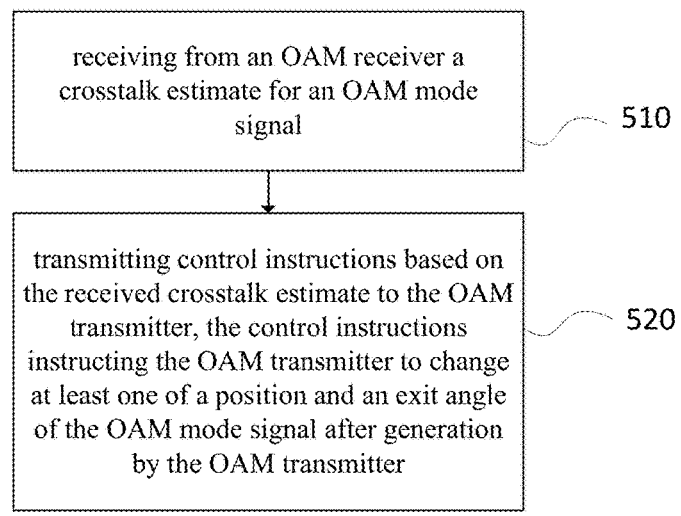
FIG. 5 illustrates an embodiment of a method for execution by a controller to control the OAM transmitter.

Referring to FIG. 5, in an implementation a method is provided for execution by a controller to control the OAM transmitter. In step 510, the controller receives from an OAM receiver a crosstalk estimated for an OAM mode signal associated with an OAM transmission transmitted from the OAM transmitter to the OAM receiver. In step 520, the controller transmits to the OAM transmitter control instructions based on the received crosstalk estimate, the control instructions instructing the OAM transmitter to change at least one of a position and an exit angle of the OAM mode signal after generation by the OAM transmitter.

Figure 6:
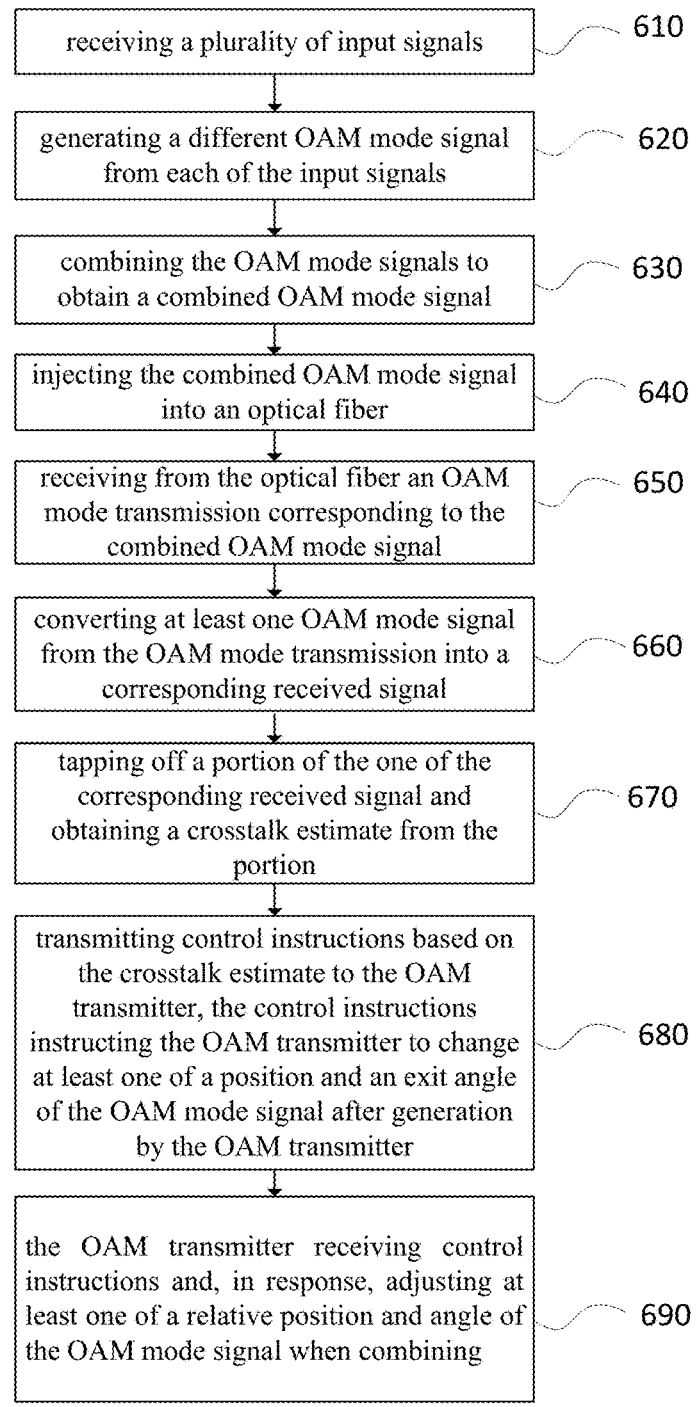
FIG. 6 illustrates an embodiment of a method for execution by a system that communicates a plurality of signals as an OAM mode transmission

Referring to FIG. 6, in an implementation a method is provided for execution by a system that communicates a plurality of signals as an OAM mode transmission. In step 610 the plurality of input signals are received by an OAM transmitter. In step 620 a different OAM mode signal is generated from each of the plurality of input signals. In some aspects, one of the plurality of input signals may be transmitted as the fundamental mode, and not converted into an OAM mode. In step 630 the OAM mode signals, and fundamental mode signal if included, are combined to obtain a combined OAM mode signal. In step 640 the combined OAM mode signal may be injected into an optical fiber by the OAM transmitter for transmission. In step 650 the OAM mode transmission is received. In step 660 at least one OAM mode signal is converted from the OAM mode transmission into a corresponding received signal (in the fundamental mode). In step 670 at least a portion of the corresponding received signal is tapped off and a crosstalk estimate is obtained from the tapped off portion. In step 680 control instructions are transmitted to the OAM transmitter based on the crosstalk estimate. The control instructions instructing the OAM transmitter to change at least one of a position and an exit angle of the at least one OAM mode signal after generation by the OAM transmitter. In step 690, the OAM transmitter receiving the control instructions and, in response, adjusting at least one of the relative position and angle of the at least one OAM mode signal when combining.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention on one or more processing elements. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A method for coupling optical signals into OAM modes for joint transmission in an optical fiber, the method comprising:
   receiving a plurality of input signals for transmission as a corresponding number of different OAM mode signals;
   generating a different OAM mode signal from each of the input signals;
   combining the OAM mode signals to obtain a combined OAM mode signal;
   injecting the combined OAM mode signal into the optical fiber for transmission to a receiving location;
   receiving control instructions from a controller in communication with the receiving location; and,
   adjusting at least one of a relative position and angle of at least one of the OAM mode signals when combining.

2. The method of claim 1, wherein the plurality of input signals further comprises a signal for transmission as a fundamental mode signal of the optical fiber, and wherein the combining the OAM mode signals further comprises combining the fundamental mode signal with the OAM mode signals to produce the combined OAM mode signal.

3. The method of claim 1, wherein the control instructions are based on a crosstalk estimate for at least one of the modes.

4. The method of claim 1, wherein the generating is performed using at least one programmable spatial light modulator (SLM), and wherein the adjusting further comprises laterally translating a spatial phase pattern used by the at least one programmable SLM to generate the OAM mode signals.

5. The method of claim 1, wherein the adjusting is performed by changing an angle of a tip-tilt optical element.

6. A method for controlling an OAM transmitter generating OAM mode transmissions coupled to an optical fiber, the method comprising a receiver:
   receiving from the optical fiber an OAM mode transmission;
   converting at least one OAM mode signal from the OAM mode transmission into a corresponding received signal;
   tapping off a portion of the corresponding received signal and obtaining a crosstalk estimate from the portion; and,
   providing the crosstalk estimate to a controller in communication with the OAM transmitter, wherein the controller is operative to use the crosstalk estimate to transmit control instructions to the OAM transmitter to change at least one of a position and an exit angle of the OAM mode signal before combination to produce the OAM mode transmission.

7. A method for controlling an OAM transmitter generating an OAM mode transmission coupled to an optical fiber, the method comprising a controller:
   receiving from an OAM receiver a crosstalk estimate for an OAM mode signal associated with the OAM mode transmission;
   transmitting control instructions based on the received crosstalk estimate to the OAM transmitter, the control instructions instructing the OAM transmitter to change at least one of a position and an exit angle of the OAM mode signal to be combined into the OAM transmission.

8. The method of claim 7, wherein the crosstalk estimate comprises a power level measurement of the OAM mode signal taken by the receiver.

9. The method of claim 7, wherein the controller is operative to optimize the crosstalk estimate by iteratively receiving the crosstalk estimate, and transmitting control instructions, until the crosstalk estimate is reduced.

10. The method of claim 9, wherein the OAM mode transmissions comprise a plurality of different OAM mode signals, and wherein the controller is further operative to optimize the crosstalk estimate by further iterating through each of the different OAM mode signals to collectively reduce the crosstalk estimates for all of the OAM mode signals.

11. An OAM optical beam transmitter comprising:
   at least one OAM beam generator, for receiving a plurality of input signals, and generating an OAM mode signal from each input signal; and,
   a beam combiner operative to receive the OAM signal and to combine the received OAM mode signals to produce a combined mode signal;
   wherein the at least one OAM beam generator is further operative to adjust a position and/or an exit angle of each OAM mode signal before sending each OAM mode signal to the beam combiner.

12. The OAM optical beam transmitter of claim 11, wherein the at least one OAM beam generator comprises a programmable SLM, and is operative to adjust a position and/or an exit angle of the OAM mode signal by translating a spatial phase pattern used by the programmable SLM to generate the OAM mode signal.

13. The OAM optical beam transmitter of claim 11, wherein the at least one OAM beam generator is operative to adjust the position and/or an exit angle of each OAM mode signal by changing an angle of a corresponding tip-tilt optical element.

14. The OAM optical beam transmitter of claim 11, wherein the at least one OAM beam generator is further operative to receive and act on control instructions from a controller, the control instructions indicating the adjustment of the position and/or exit angle of each OAM mode signal.

15. The OAM optical beam transmitter of claim 11, wherein the at least one OAM beam generator is selected from the group consisting of:
   a programmable spatial light modulator (SLM);
   a circular grating coupler;
   a diffraction grating; and,
   integrated versions of one or more of a SLM, a circular grating coupler, and a diffraction grating.

16. A system for coupling optical signals into OAM modes for joint transmission in an optical fiber, the system comprising:
   at least one OAM beam generator, for receiving one or more of a plurality of input signals, and generating a different OAM mode signal for each of the plurality of input signals;
   a beam combiner operative to receive the OAM signals and to combine the received OAM mode signals to produce a combined mode signal;
   wherein the at least one OAM beam generator is further operative to adjust a location and/or an exit angle the OAM mode signals before sending the OAM mode signals to the beam combiner;

a fiber launcher for injecting the combined mode signal into an optical fiber;

a receiver for receiving the combined mode signal from the optical fiber and converting from the combined modes each OAM mode signal into a corresponding received fundamental mode;

at least one crosstalk estimate sensor for obtaining a crosstalk estimate for each OAM mode signal; and, a controller in communication with the at least one crosstalk estimate sensor and the at least one OAM beam generator, the controller operative to optimize the crosstalk estimate by receiving the crosstalk estimate one of the OAM mode signals, and sending control instructions instructing the at least one OAM beam generator to adjust a location and/or an exit angle of the one or more OAM mode signals to reduce the crosstalk estimate.

17. The system of claim 16, wherein the controller is further operative to iteratively receive crosstalk estimates and send control instructions to the at least one OAM beam generator until the crosstalk estimate is reduced.

18. The system of claim 16, wherein the controller is further operative to reduce a collective crosstalk estimate for all of the OAM mode signals by iterating through each of the OAM mode signals.

19. The system of claim 16 wherein the crosstalk estimate sensor comprises a power meter for measuring a power level of each of the one or more OAM mode signals.

20. The system of claim 16, wherein the at least one optical beam generator comprises a programmable SLM, and wherein the at least one OAM beam generator is further operative to adjust a position and/or an exit angle of the one or more OAM mode signals by translating a spatial phase pattern used by the programmable SLM to generate the one or more OAM mode signals.

21. The system of claim 16, wherein the at least one OAM beam generator is selected from the group consisting of:
- a programmable spatial light modulator (SLM);
- a circular grating coupler;
- a diffraction grating; and,
- integrated versions of one or more of a SLM, a circular grating coupler, and a diffraction grating.

* * * * *